US009989168B2

(12) United States Patent
Huang et al.

(10) Patent No.: US 9,989,168 B2
(45) Date of Patent: Jun. 5, 2018

(54) PIPELINE FREESPAN SUPPORT

(71) Applicant: DMAR ENGINEERING, INC., Houston, TX (US)

(72) Inventors: Zhiming Huang, Missouri City, TX (US); Dagang Zhang, Houston, TX (US)

(73) Assignee: DMAR Engineering, Inc., Houston, TX (US)

( * ) Notice: Subject to any disclaimer, the term of this patent is extended or adjusted under 35 U.S.C. 154(b) by 0 days. days.

(21) Appl. No.: 15/176,189

(22) Filed: Jun. 8, 2016

(65) Prior Publication Data

US 2016/0290530 A1 Oct. 6, 2016

Related U.S. Application Data

(62) Division of application No. 14/286,991, filed on May 24, 2014, now Pat. No. 9,388,917.

(51) Int. Cl.
| | |
|---|---|
| F16L 1/14 | (2006.01) |
| F16L 1/16 | (2006.01) |
| F16L 1/20 | (2006.01) |
| F16L 3/11 | (2006.01) |
| F16L 3/22 | (2006.01) |
| E04G 1/06 | (2006.01) |
| F16L 1/12 | (2006.01) |
| F16L 3/02 | (2006.01) |
| F16L 3/00 | (2006.01) |
| F16L 3/08 | (2006.01) |
| E04G 7/24 | (2006.01) |

(52) U.S. Cl.
CPC ............... *F16L 1/14* (2013.01); *E04G 1/06* (2013.01); *F16L 1/123* (2013.01); *F16L 1/16* (2013.01); *F16L 1/20* (2013.01); *F16L 3/00* (2013.01); *F16L 3/02* (2013.01); *F16L 3/08* (2013.01); *F16L 3/22* (2013.01); *E04G 7/24* (2013.01)

(58) Field of Classification Search
CPC ..................................... F16L 3/00; F16L 3/16
See application file for complete search history.

(56) References Cited

U.S. PATENT DOCUMENTS

| | | | | |
|---|---|---|---|---|
| 566,364 | A * | 8/1896 | Wilson | E21B 15/00 256/72 |
| 2,452,487 | A * | 10/1948 | O'Sullivan | E04G 1/14 52/637 |
| 3,303,937 | A | 2/1967 | Mcconnell | |
| 3,564,803 | A * | 2/1971 | Breeze et al. | E04G 11/48 182/178.5 |

(Continued)

Primary Examiner — Tara Mayo-Pinnock
(74) Attorney, Agent, or Firm — Liaoteng Wang

(57) ABSTRACT

Apparatus and methods related to pipeline freespan support are described. For example, some embodiments may contain an upper structure, which contains at least four legs connected to one another by a number of bracing members, and a number of attachment points through which the upper structure can be lifted, and a lower structure, which contains at least four posts that can be connected to, and disconnected from as needed, the four legs of the upper structure, two spaced mud mats on which the posts stand, and at least two horizontal arms that can be attached to the posts, rotate about the posts, connect to and be locked with the posts on the other mud mat, and be lifted to an appropriate height to provide suitable support at the pipeline freespan location.

9 Claims, 6 Drawing Sheets

(56) References Cited

U.S. PATENT DOCUMENTS

| | | | | |
|---|---|---|---|---|
| 3,648,982 A * | 3/1972 | Sabel | ............... | E04F 11/1834 |
| | | | | 256/22 |
| 3,676,972 A * | 7/1972 | Ballou | ............... | E04G 1/14 |
| | | | | 248/354.5 |
| 3,835,612 A * | 9/1974 | Beziat | ............... | E04G 11/48 |
| | | | | 182/178.5 |
| 4,004,393 A * | 1/1977 | Morris | ............... | E04G 7/305 |
| | | | | 182/179.1 |
| 4,139,142 A * | 2/1979 | Maple | ............... | F16L 3/16 |
| | | | | 228/175 |
| 4,140,292 A * | 2/1979 | Kaigler, Jr. | ............... | F16L 3/16 |
| | | | | 248/49 |
| 4,355,925 A * | 10/1982 | Rognoni | ............... | F16L 1/20 |
| | | | | 248/49 |
| 4,462,197 A * | 7/1984 | D'Alessio | ............... | E04G 1/12 |
| | | | | 182/178.5 |
| 5,026,028 A * | 6/1991 | Ooi | ............... | E04F 11/1834 |
| | | | | 248/251 |
| 5,163,642 A * | 11/1992 | Torrens | ............... | F16L 3/00 |
| | | | | 248/49 |
| 6,061,984 A * | 5/2000 | Rose | ............... | F16L 3/24 |
| | | | | 52/220.1 |
| 6,161,359 A * | 12/2000 | Ono | ............... | E04G 11/48 |
| | | | | 14/75 |
| 6,354,767 B1 * | 3/2002 | Jones | ............... | E02D 13/04 |
| | | | | 405/228 |

* cited by examiner

PIPELINE FREESPAN SUPPORT

CROSS REFERENCE TO RELENTED APPLICATION

This application is a division of U.S. patent application Ser. No. 14/286,991, filed on May 24, 2014, and incorporated herein by reference.

FIELD OF PRESENT DISCLOSURE

This present disclosure relates to pipeline freespan support.

BACKGROUND INFORMATION

Pipeline freespans commonly arise under uneven seabed topography conditions. Long freespans could introduce strength and fatigue concerns to the pipeline, and require artificial supports to ensure the pipeline stability. Grout bags are usually used for shallow-water pipeline freespan supports. However, grout bags require supply hoses to connect the grout bags and surface vessels in order to fill them. When water depth increases, the grout bag supply hoses become a constraint, making the use of grout bags as freespan supports more difficult and costly. Apparatus and methods have been proposed to provide support to pipelines at the freespan locations.

DETAILED DESCRIPTION

Figure 1:
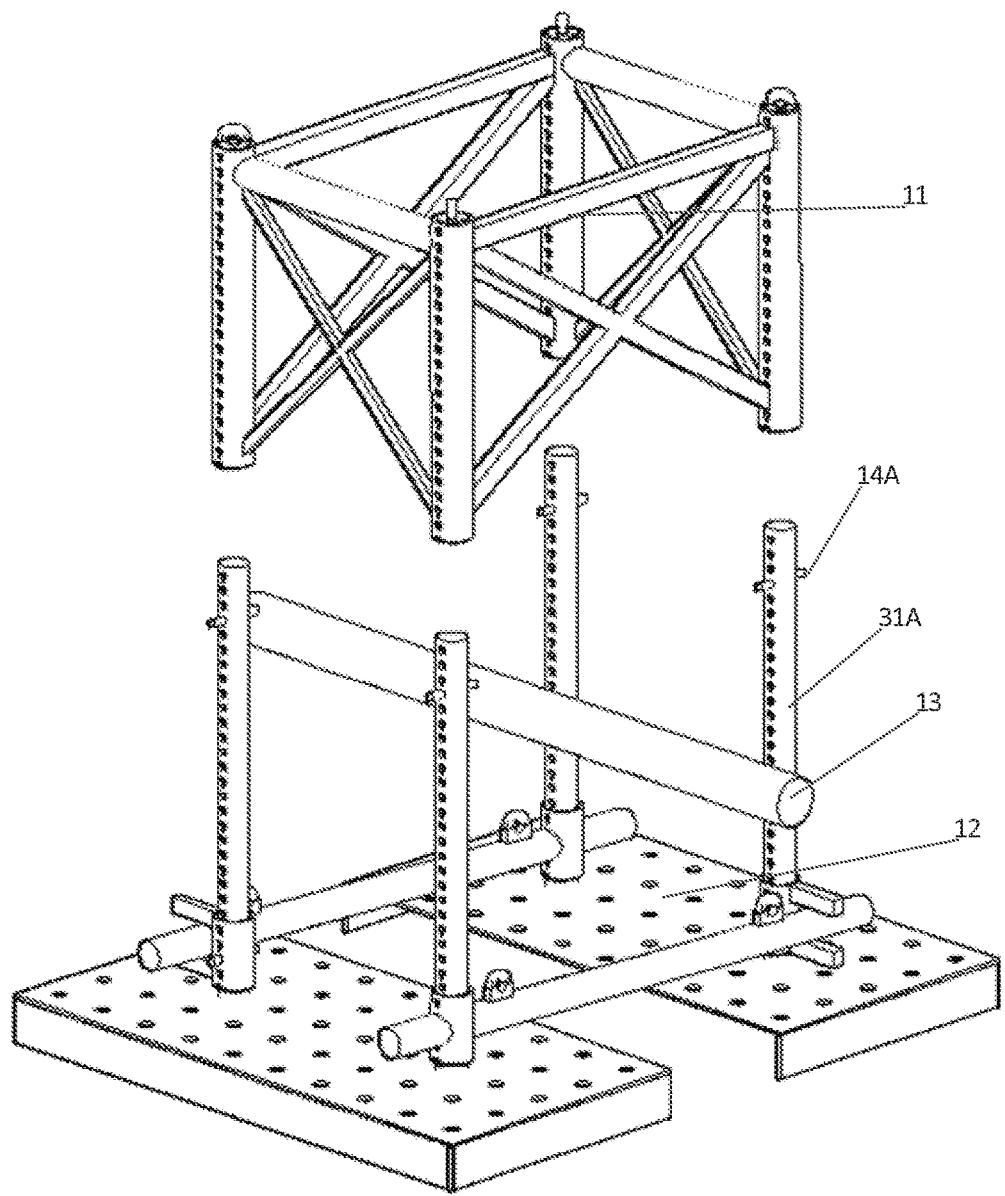
FIG. 1 is a diagram showing the overview of an embodiment of the pipeline freespan support, comprising an upper structure and a lower structure, with a pipeline going through the lower structure.

This document discloses apparatus and methods related to pipeline freespan support. FIG. 1 shows an implementation of the apparatus and methods for pipeline freespan support. The freespan support comprises an upper structure 11 and a lower structure 12, which are further illustrated in FIG. 2 and FIG. 3, respectively. The upper structure has four legs 21. The lower structure 12 has four posts 31, which can be inserted into the four legs 21 of the upper structure 11, and locked by pins 14A, 14B, 14C and 14D. During installation, the upper structure 11 and lower structure 12 are first integrated into one structure. After the integrated structure is landed on the sea floor, the locking pins 14 can be removed, and the upper structure 11 is then retrieved back to surface, while the lower structure 12 stays on the sea floor to provide support to the pipeline.

Figure 2:
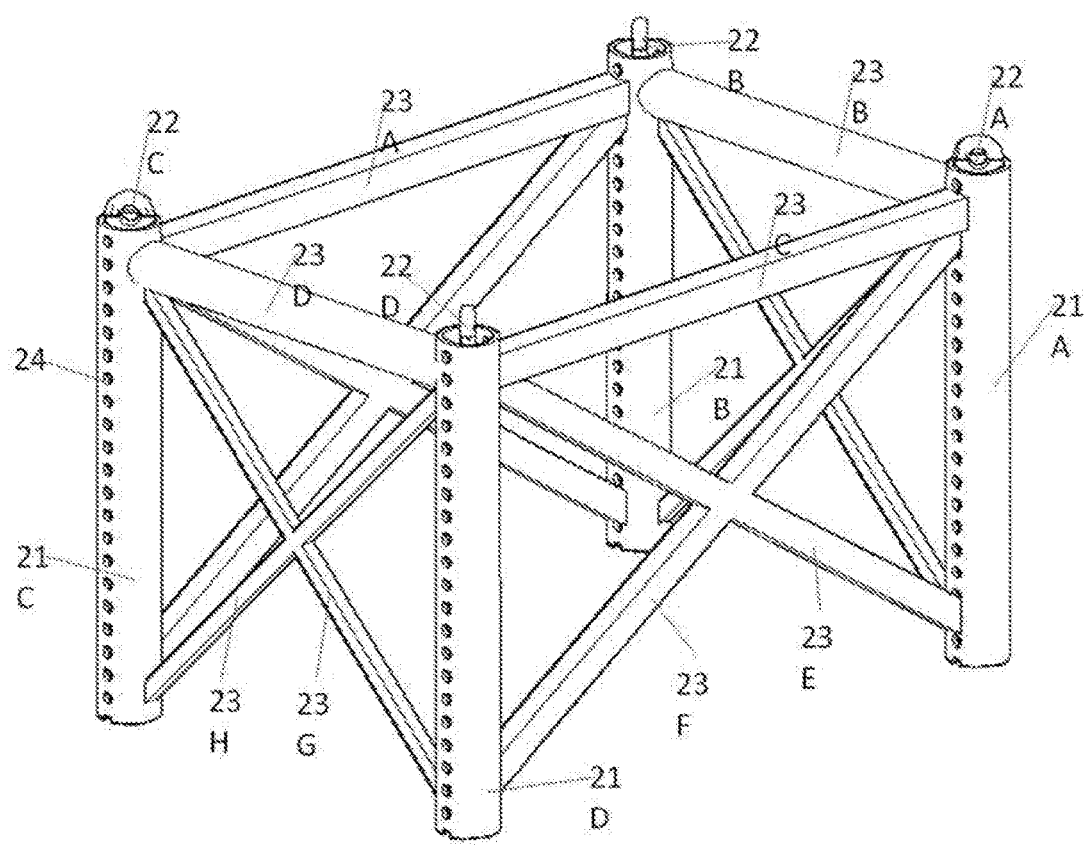
FIG. 2 is a diagram showing the zoomed-in view of an embodiment of the upper structure of the pipeline freespan support.

FIG. 2 shows the zoomed-in view of an implementation of the upper structure of the pipeline freespan support. The upper structure has four legs 21A, 21B, 21C, and 21D, four padeyes 22A, 22B, 22C, 22D, and a plurality of bracing members 23A, 23B, . . . , 23H. A plurality of through holes 24 can be vertically arranged on each of the four legs 21A, 21B, 21C and 21D.

Figure 3:
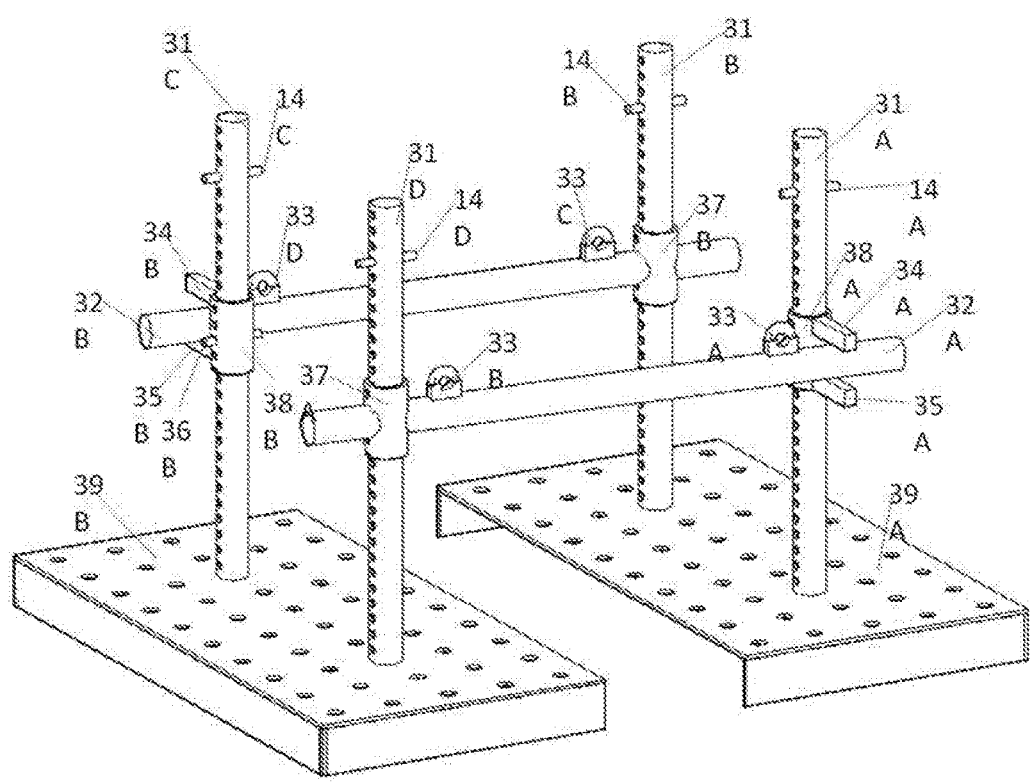
FIG. 3 is a diagram showing the zoomed-in view of an embodiment of the lower structure of the pipeline freespan support.

FIG. 3 shows the zoomed-in view of an implementation of the lower structure of the pipeline freespan support. The lower structure has two spaced mud mats 39A and 39B that will rest on seabed. Each mud mad 39 has two posts 31 standing on it, and can have spaced holes for conveniently positioning the posts. A plurality of through holes 24 can be vertically arranged on each of the four posts 31A, 31B, 31C and 31D. Two kinds of sheath, 37 and 38, wrap around the four posts, with the same kind facing each other diagonally. Two horizontal arms 32A and 32B can slide along sheath 38, which has two teeth 34 and 35, forming an open passage for the horizontal arm 32 to slide along. A locking mechanism can be added to the two teeth 34 and 35 so that the horizontal arm 32 can be locked in place after it rotates into the space between the two teeth 34 and 35. The other end of the horizontal arm 32 can rotate around the post 31 through sheath 37, which has a hole through which the arm can slide along, and can also have a mechanism to fix the position of the horizontal arm 32 relative to the sheath 37 once the desired position is reached. The position of the sheath 37 or 38 can be fixed on the post 31 by a locking pin, such as 36B. Each horizontal arm 32 can also have two padeyes 33A, 33B, 33C, and 33D, which can be used to raise the horizontal arm 32 along the posts 31.

In some implementations, the freespan support can be about three to four meters in height, four meters in width, and four meters in length. In some other implementations, the freespan support can replace the locking pins by other locking mechanism, such as ratchet.

Figure 4:
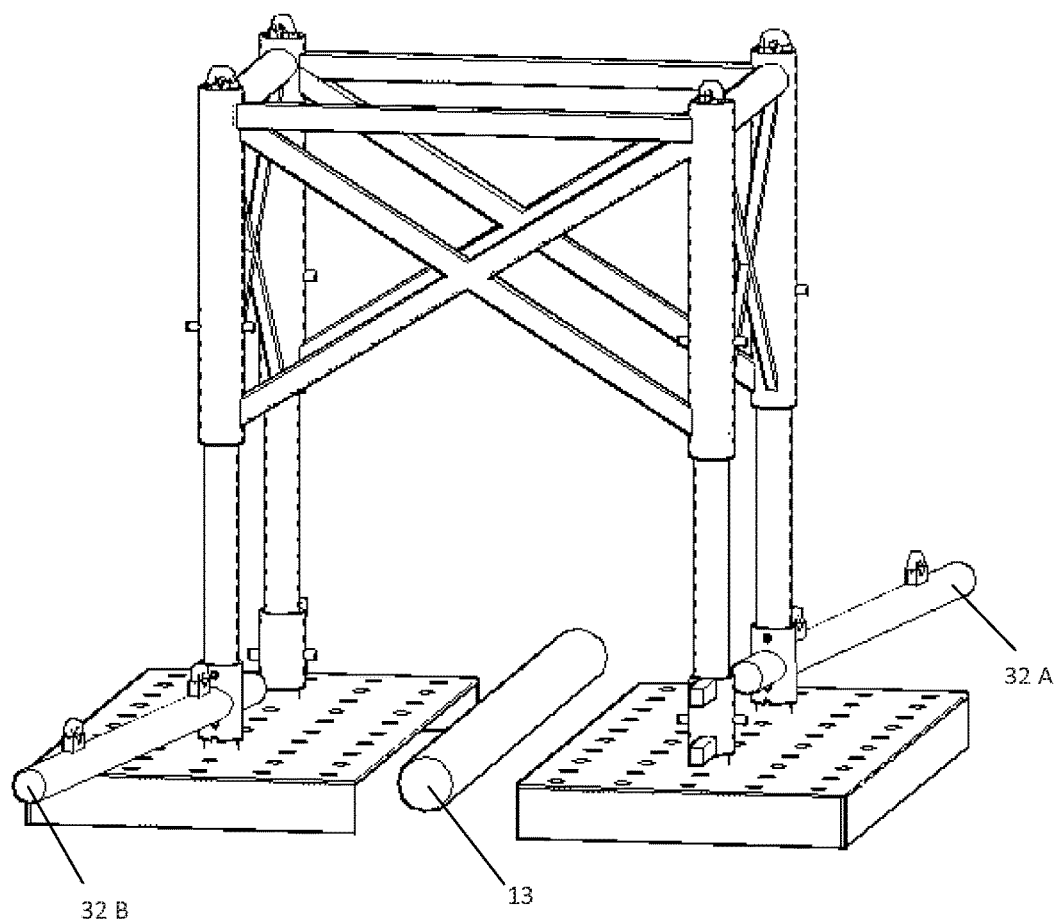
FIG. 4 is a diagram showing the integrated upper and lower structure of the pipeline freespan support being lowered over a pipeline so that the pipeline becomes contained within the lower structure, and the two horizontal arms in open positions.
Figure 5:
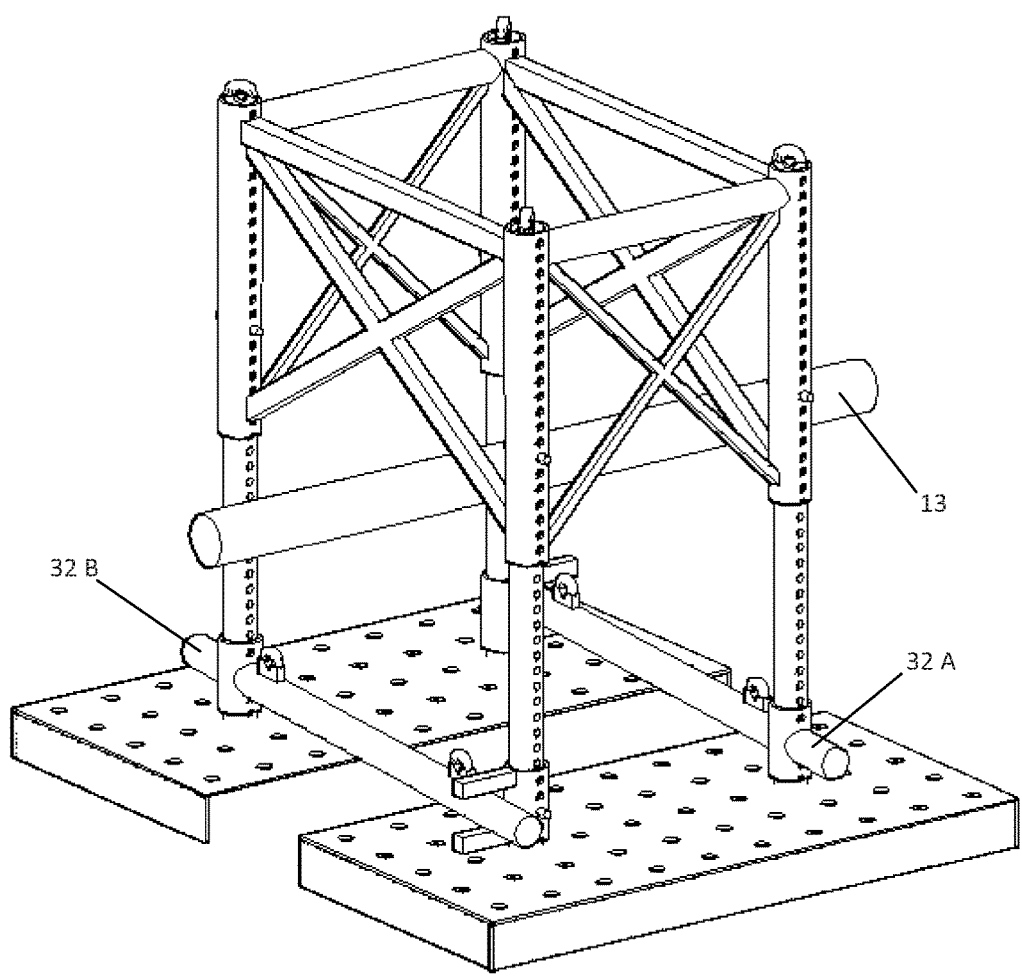
FIG. 5 is a diagram showing the integrated upper and lower structure of the pipeline freespan support being rested on the sea floor, with the pipeline contained within the space of the lower structure, and the two horizontal arms attached to the lower structure having rotated into a locking position.
Figure 6:
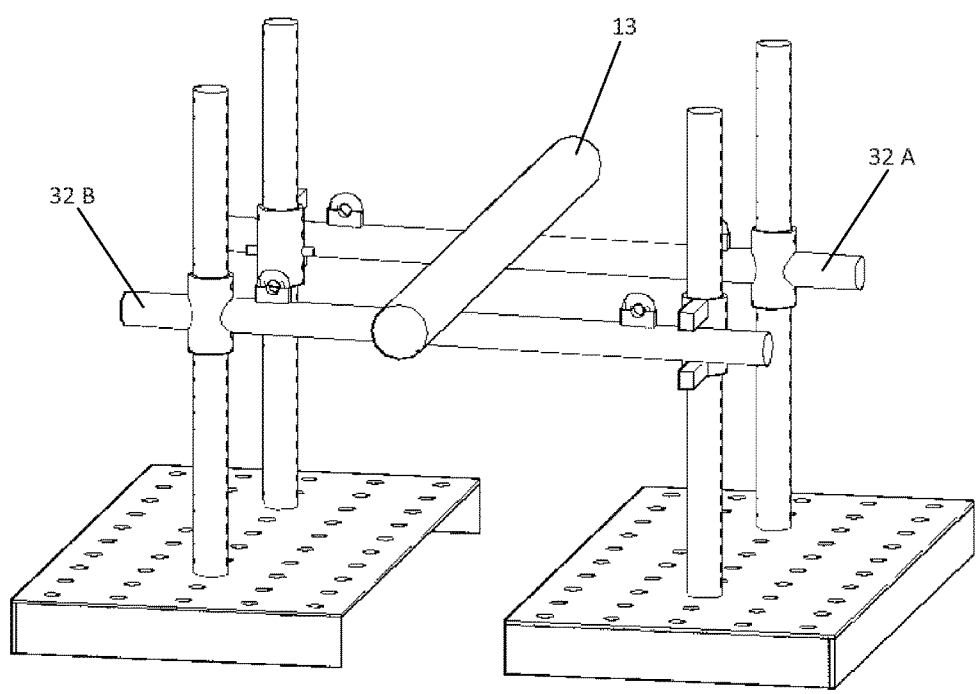
FIG. 6 is a diagram showing the upper structure of the pipeline freespan support has been removed, and the two horizontal arms have been raised to support the pipeline.

In some implementations, the freespan support structure can be installed as shown in FIGS. 4 through 6, and as follows: (i) position the lower structure 12 on deck, mount the upper structure 11 onto the lower structure 12, adjust the upper structure elevation such that its center elevation is about one meter or a different dimension as needed) higher than the pipeline freespan height from seabed, lock the upper structure 11 on the lower structure 12 through locking pins 14 to form an integrated structure, and leave a gap about one to two meters in width (or a different dimension as needed) between the two mud mats 39; (ii) lift the integrated structure and lower it over the pipeline, ensuring the horizontal arms remain open during the lowering process; (iii) land the integrated structure over the pipeline such that the pipeline is at the center of the freespan support; (iv) rotate and lock the horizontal arms 32; (v) remove the locking pins 14 and retrieve the upper structure 11 to deck, leaving the lower structure 12 on the sea floor; (vi) attach lifting riggings on the padeyes 33 on the horizontal arms 32, and lift the horizontal arms 32 up until both arms are in contact with the pipeline and provide suitable support; and (vii) secure the horizontal arms in position by fixing the sheaths on the posts using, for example, through holes and locking pins. This sequence of installation above can be reversed as appropriate for uninstallation.

Other Embodiments

Various other adaptations and combinations of features of the embodiments and implementations disclosed are within the scope of the present disclosure. It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for providing support at a pipeline at a freespan location, comprising:
   providing a first structure comprising:
      first and second mud mats;
      a first post extending from the first mud mat;
      a first sheath fitted around the first post, the first sheath being rotatable about the first post and translatable along the first post;
      a horizontal arm coupled to the first sheath so the horizontal arm is rotatable about the first post and translatable along the first post;
      a second post extending from the second mud mat; and
      a second sheath fitted around the second post, the second sheath comprising teeth that receive a distal end of the horizontal arm, the second sheath being translatable along the second post;
   providing a second structure comprising:
      first and second legs detachably engaged to the first and the second posts of the first structure; and
      bracing members fixed to the first and the second legs;
   integrating the first and the second structures at an appropriate height, wherein the first and the second posts of the first structure engage the first and the second legs of the second structure;
   locking the first and the second structures together to form an integrated structure;
   lowering the integrated structure over the pipeline at the freespan location, with the horizontal arm in an open position, allowing the pipeline to pass through an opening between the first and the second mud mats, and landing the integrated structure on an underwater floor;
   rotating the horizontal arm into the teeth of the second sheath;
   unlocking the second structure from the first structure, retrieving the second structure to surface, and leaving the first structure on the underwater floor; and
   lifting the horizontal arm until the horizontal arm is in contact with and provides support to the pipeline, and fixing the horizontal arm in a supporting position.

2. The method of claim 1, wherein:
   the first and the second legs are hollow;
   integrating the first and the second structures comprises inserting the first and the second posts into the first and the second legs; and
   locking the first and the second structures together comprises locking the first and the second legs to the first and the second posts by pins.

3. The method of claim 2, wherein the first post, the second post, the first leg, and the second leg have vertically arranged first through holes for receiving the pins.

4. The method of claim 3, wherein the first and the second sheaths have second through holes and the method further comprises locking the first and the second posts using additional pins.

5. The method of claim 1, wherein the first and the second mud mats have spaced holes for positioning the first and the second posts.

6. The method of claim 1, wherein retrieving the second structure comprises lifting the second structure by attachment points on the second structure.

7. The method of claim 6, wherein the attachment points are padeyes at the top of the first and the second legs.

8. The method of claim 1, wherein the second post is parallel with the first post.

9. The method of claim 1, wherein lifting the horizontal arm comprises lifting the horizontal arm by padeyes on the horizontal arm.

* * * * *